United States Patent [19]

Weitzberg

[11] Patent Number: 4,591,479
[45] Date of Patent: May 27, 1986

[54] BOILING WATER REACTOR FUEL BUNDLE

[75] Inventor: Abraham Weitzberg, Potomac, Md.

[73] Assignee: NUS Corporation, Gaithersburg, Md.

[21] Appl. No.: 583,789

[22] Filed: Feb. 29, 1984

Related U.S. Application Data

[63] Continuation of Ser. No. 270,207, Jun. 3, 1981, abandoned.

[51] Int. Cl.[4] ................................................ G21C 3/32
[52] U.S. Cl. .................................... 376/349; 376/423; 376/428; 376/435; 376/447
[58] Field of Search ............... 376/423, 425, 447, 370, 376/428, 435, 349

[56] References Cited

U.S. PATENT DOCUMENTS

| | | | |
|---|---|---|---|
| 3,049,487 | 8/1962 | Harrer et al. | 376/447 X |
| 3,141,829 | 7/1964 | Fortescue et al. | 376/423 X |
| 3,145,149 | 8/1964 | Imhoff | 376/435 X |
| 3,145,150 | 8/1964 | Gylfe | 376/423 |
| 3,170,847 | 2/1965 | Dudek et al. | 376/421 |
| 3,367,837 | 2/1968 | Nims et al. | 376/425 X |
| 3,986,924 | 10/1976 | Motoda | 376/349 |
| 4,148,687 | 4/1979 | Chien et al. | 376/447 X |
| 4,393,510 | 7/1983 | Lang et al. | 376/428 X |

FOREIGN PATENT DOCUMENTS

| | | | |
|---|---|---|---|
| 0094183 | 7/1980 | Japan | 376/435 |
| 0070488 | 6/1981 | Japan | 376/423 |

Primary Examiner—Deborah L. Kyle
Assistant Examiner—Dan Wasil
Attorney, Agent, or Firm—Sughrue, Mion, Zinn, Macpeak and Seas

[57] ABSTRACT

A fuel bundle for a boiling water reactor contains a plurality of fuel rods, some of which contain a moderating material rather than nuclear fuel or contain nuclear fuel in the lower section of the fuel rod and moderating material in the upper section thereof, for improving both the axial and radial power shapes of the fuel bundle. The moderating material in the upper section of the fuel rods increases the neutron moderation in this section of the bundle, thereby compensating for the poor water moderation of the boiling water in this section, increasing the power generated in this section and flattening the axial power shape of the bundle. Fuel rods in the interior section of the bundle contain moderating material which also flattens the radial power shape. Caps containing moderating material are also placed on the upper end of each fuel rod in order to reflect neutrons thereby reducing the top axial fast-neutron leakage.

23 Claims, 6 Drawing Figures

BOILING WATER REACTOR FUEL BUNDLE

This application is a continuation, of application Ser. No. 270,207, filed June 3, 1981 now abandoned.

BACKGROUND OF THE INVENTION

The present invention relates to a boiling water reactor (BWR) and more particularly to fuel bundles and fuel rods used in boiling water reactors.

A boiling water reactor contains a plurality of fuel bundles, each of which contains a plurality of fuel rods. The fuel rods extend from the bottom to the top of the reactor. The lengthwise direction along the rods is the axial direction of the fuel bundle, and the widthwise direction through the rods is the radial direction.

The nuclear fuel in the fuel rods fission, producing heat, and the heat is conveyed from the reactor by water which enters the bottom of the reactor and exits from the top thereof. The water flows within each fuel bundle and also flows through water gaps between the bundles. The water is continuously heated as it flows up through the reactor. The water flowing in the water gaps does not boil significantly, but the water flowing within the bundles eventually boils at some point along the axial direction of the bundle, thereby creating steam and a boiling region in the fuel bundle. The steam produced from the water travelling through the reactor is used to generate power.

The majority of nuclear fissions that occur in the fuel are created by the absorption of thermal (slow) neutrons by the fuel, thereby causing the fuel to fission and release heat. Each fission produces new neutrons which continue a chain reaction. The new neutrons, commonly referred to as fast neutrons, possess a large amount of energy and must be slowed down by a moderating material in order to produce additional thermal neutrons which can cause further fissions.

Since water is a good moderating material, the water flowing in the water gaps and channels is generally used to moderate or slow down the fast neutrons. However, since the water flowing in the channels eventually boils and creates steam as it travels upward through the bundle, the density of the water in the boiling region diminishes, thereby reducing the moderating capability of the water in the boiling region of the bundle. The variation in moderating capability results in more fissions and, therefore, more power being generated in the non-boiling region of the fuel bundle than in the boiling region of the fuel bundle, thereby creating a non-uniform axial power shape. The axial power shape peaks somewhere in the lower half of the fuel bundle in the nonboiling region.

If uncorrected, this non-uniform axial power shape can limit the overall reactor power generation since the excessive temperatures generated in the vicinity where the power peaks must not exceed design limitations. This non-uniform axial power shape can also cause the fuel to be consumed in the bottom of the fuel bundle at a rate faster than it is consumed in the top of the fuel bundle at the beginning-of-life of the fuel bundle. At the end-of-life of the fuel bundle, the lower section of the fuel bundle burns out, but a large portion of the fuel in the top of the fuel bundle remains unburned, resulting in poor fuel utilization. In addition, near the-end-of-life, the amount of reactivity in the top of the fuel bundle is excessively large due to the relatively small amount of fuel burnup therein, thereby reducing the cold shut-down margin. The excessive reactivity in the top of the fuel bundle also makes the effective scram reactivity insertion rate slower since control rods used in scramming the reactor are inserted through the bottom of the reactor.

Finally, the poor neutron moderation in the upper section of the reactor causes, in this section, fast neutron streaming which is a major source of damage to the reactor pressure vessel and internals.

Present BWR designs modify the axial power shape of the fuel bundles in order to minimize these disadvantages. Present techniques rely on the use of burnable poisons and poisoned control rods. Burnable poisons, such as gadolinium, are generally unevenly dispersed in the fuel rods, with a large amount being put in the lower section thereof to absorb neutrons in this section and help flatten the axial power shape of the fuel bundle.

In addition, during reactor operation, poisoned control rods are partially inserted into the reactor through the bottom of the reactor to also absorb neutrons in that section, further flattening the axial power shape of the bundles.

Both of these methods of power shaping have an adverse effect on fuel utilization since neutrons having a potential for producing fissions are parasitically absorbed. In addition, the reactivity in the top of the fuel bundles at the end-of-life still tends to be quite large due to the larger portion of unburned fuel in that section, whereby the scram reactivity insertion rate and cold shut-down margin are adversely affected. Finally, neither of these methods reduce the fast neutron streaming in the upper section of the reactor pressure vessel.

An additional moderating problem present in BWR designs is caused by the radial distribution of the moderating water. As indicated previously, water flows up through channels in the bundles and up through water gaps between the bundles. However, since the water in the water gaps does not boil but the water flowing in the bundles does, the moderating capability of the water flowing outside of the bundles exceeds that of the water flowing within the bundles. This variation in moderating capability produces a non-uniform radial power shape. The amount of power produced by the fuel rods located closest to the non-boiling water gaps is higher than the amount of power produced by the fuel rods located towards the center of the fuel bundle. Again, in order to limit local power peaks, various methods are utilized to limit the power produced in the fuel rods closest to the water gaps. These methods include using uranium of reduced $U^{235}$ enrichment in the fuel rods closest to the water gaps and the inclusion of non-boiling water rods in the center of the bundle. The enrichment variations add to the manufacturing complexity and may also reduce fuel utilization.

Gylfe, U.S. Pat. No. 3,145,150 and Vann et al., U.S. Pat. No. 3,178,354 describe fuel rods having short top and bottom caps of moderating material. Although these moderating caps reduce the axial fast neutron leakage from the fuel bundle, their effect on the axial power shape is limited to the very ends of the bundle. They do not significantly modify the axial power shape over the entire length of the bundle.

Other fuel rod and fuel bundle designs are shown in the following U.S. Pat. Nos. 4,127,443; 3,822,185; 3,793,144; 3,274,066; 3,218,237; 3,157,581; 3,146,173; 3,141,829; 3,133,000; 3,119,747; 3,049,487; 3,039,947.

SUMMARY OF THE INVENTION

It is therefore an object of the present invention to overcome the disadvantages of the prior art by providing a BWR fuel bundle that has a flatter axial power shape.

A further object is to provide a BWR fuel rod having a flatter radial power shape as well as a flatter axial power shape.

A still further object is to provide fuel rods for a fuel bundle that permit efficient fuel utilization, improve the scram reactivity insertion rate, reduce the cold shutdown margin requirements, and reduce the fast neutron damage to the reactor pressure vessel by reducing the leakage of fast neutrons from the highly voided upper region of the reactor.

These and other objects are achieved by replacing all or some of the fuel in some of the fuel rods with a moderating material. The section of the fuel rods containing moderating material is located above the section of the fuel rod containing fuel. The moderating material in the upper section of the fuel rod increases the moderating capability in the upper section of the fuel bundle, thereby increasing the amount of thermal neutrons in this region and, in turn, increasing the amount of power produced in this region thereby producing a flatter axial power shape. At the same time, less fuel is required to fill the fuel bundle, thereby reducing costs. Increased fuel utilization is achieved since burnable poisons and poisoned control rods are not necessary for power shaping. Since these fuel bundles require less fuel in the upper section thereof, and since the fuel in that section is consumed at a faster rate due to the increased moderation, the top of the reactor contains less reactivity at the end-of-life than in the prior art designs, thereby increasing the scram reactivity insertion rate and the cold shut down margin.

Likewise, the radial power shape within the bundle is flattened by placing fuel rods containing a solid moderating material in the interior sections of the fuel bundle, thereby increasing the neutron moderation in those sections. This is more effective than the present design using non-boiling water rods for this purpose.

The length of the fuel rod section containing moderating material is substantial, ranging between 15% and 100% of the length of the rod, in order to have a significant axial power shaping effect over the entire length of the fuel bundle.

Additional fuel utilization and further power shaping are achieved by placing a short cap at the upper end of most or all of the fuel rods for reflecting neutrons, thus reducing the top axial fast-neutron leakage.

DESCRIPTION OF THE PREFERRED EMBODIMENTS

Figure 1:
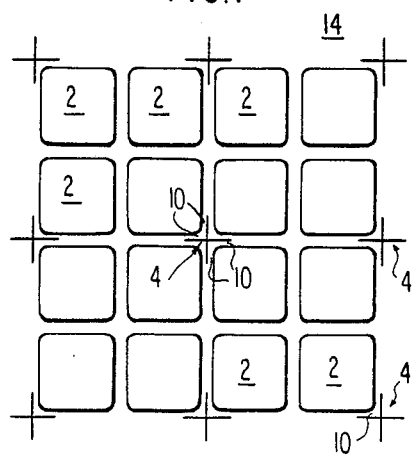
FIG. 1 is a top view of a portion of a BWR reactor showing a plurality of fuel bundles.

Referring to FIG. 1, there is shown a section of a BWR 14 containing a plurality of closely spaced rectilinear fuel bundles 2 and a plurality of poison control blades 4 therebetween. A small gap exists between the control blades 4 and the fuel bundles 2, thus forming water gaps 10 along the length of the outside walls of the fuel bundles 2. Cooling and moderating water flows along the water gaps 10.

Figure 2:
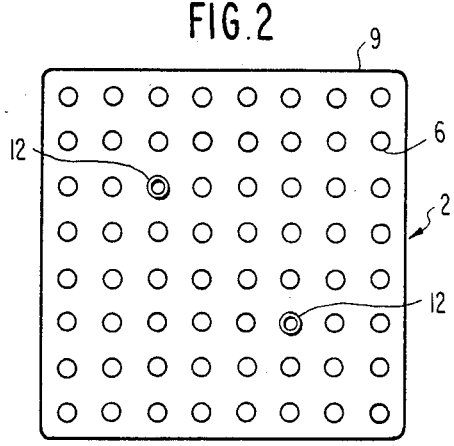
FIG. 2 is a top view of a single BWR fuel bundle.
Figure 5:
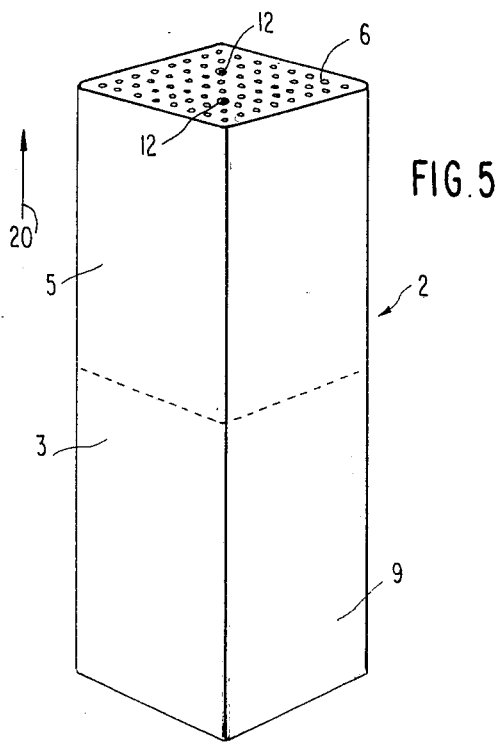
FIG. 5 is a perspective view of a fuel bundle.

FIGS. 2 and 5 show a single fuel bundle 2 having a casing 9 which contains sixty-two fuel rods 6. The fuel bundle 2 also contains two interior channels 12 through which non-boiling moderating water flows. Cooling water also flows up through the bundles 2 and between the fuel rods 6 and interior channels 12. The cooling water enters the water gaps 10, the fuel bundles 2 and the interior channels 12 at the bottom of the reactor 14 and exits at the top of the reactor 14. At some point while flowing up through the bundle 2, the water between the fuel rods begins to boil, thereby creating steam voids in the upper section 5 (FIG. 5) of the fuel bundle 2. The water in the water gaps 10 and the interior channels 12 does not boil significantly.

Since the boiling water contains steam voids, the moderating capability of the water in the boiling section of bundle 2 is less than the moderating capability of the non-boiling water in gaps 10 and the interior channels 12, and also less than the moderating capability in the non-boiling section of the bundle 2. This variation in moderating capability creates a non-uniform axial and radial power shape.

Figure 4:
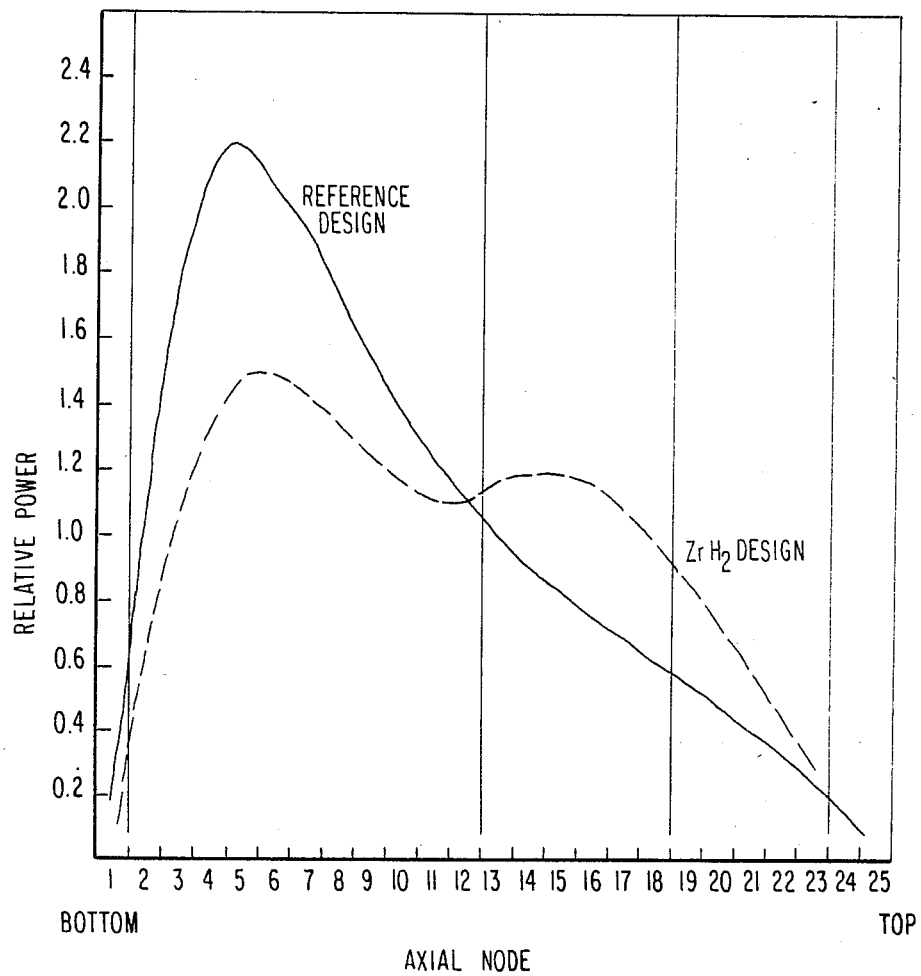
FIG. 4 is a graph showing the relative power produced by a reference design fuel bundle without the use of burnable poisons or control rods, and by a fuel bundle made in accordance with the present invention.

The "Reference design" line on the graph shown in FIG. 4 indicates a typical non-uniform axial power shape for a fuel bundle where no means are used to correct for the non-uniform moderating capability of the water. As can readily be seen, the relative power peaks at 2.2 along the fuel bundle 2 at a point very near the bottom of the fuel bundle 2, well below the middle of the bundle.

Figure 3:
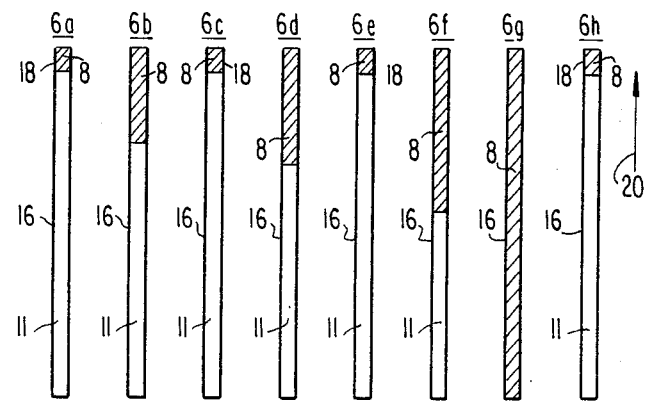
FIG. 3 is a side view of a plurality of BWR fuel rods.

FIG. 3 shows eight individual fuel rods 6a, 6b, 6c, . . . 6h made in accordance with the present invention for use in the fuel bundles 2. These fuel rods contain both nuclear fuel 11 and moderating material 8. The nuclear fuel is commonly uranium dioxide ($UO_2$) partially enriched in the isotope $U^{235}$, although many other kinds of nuclear fuel can be utilized. From a neutron utilization standpoint, the optimum moderating material is zirconium hydride, $ZrH_2$, although other kinds of moderating material 8 can be used. Other common moderating materials 8 include, but are not limited to, graphite, beryllium (metal or oxide) and other metal hydrides or deuterides. Among the hydrides which may be use are lithium, calcium, yttrium, niobium, vanadium, and titanium.

The length of the fuel rod section containing moderating material is substantial, ranging between 15% and 100% of the length of the fuel rod, in order to have a significant axial and radial power shaping effect over the entire length of the fuel bundle.

As can be seen in FIG. 3, each of the fuel rods contains a cap 18 at the upper end thereof, and each cap contains the moderating material 8 which serves to reflect fast neutrons escaping in the axial direction, shown by arrow 20, of the fuel bundle 2. For fuel rods which are nominally twelve feet long, as in modern BWR's, the length of these caps should range between 6 and 24 inches. The preferred cap length is about 12 inches since this approaches the effect of an infinitely thick reflector. Since the reflector is not solid, due to the spacing between the fuel rods, a slightly thicker cap may be desirable. Fuel rod 6g contains only solid moderating material and fuel rods 6b, 6d, and 6f contain varying amounts of fuel and moderating material, with the moderating material 8 being located in the upper section of the fuel rods 6 and the fuel 11 being located in the lower section of the fuel rods 6.

By replacing the nuclear fuel 11 in the upper sections of the fuel rods 6 with moderating material 8, additional neutron moderation occurs in the upper section of the fuel bundle 2, and this additional moderation increases the power produced in this section even though it contains less fuel. The increased power produced in the upper section of the fuel bundle tends to flatten the axial power shape of the fuel bundle. Also, optimum placement of the fuel rods containing the moderating material, especially the fuel rods containing moderating material and no nuclear fuel, in the interior region of the fuel bundle tends to flatten the radial power shape of the fuel bundle as well. Present BWR fuel bundle designs contain two non-boiling water moderator rods. However, the solid moderator rods containing $ZrH_2$ have a larger hydrogen density and, therefore, are more effective. By using the $ZrH_2$ for the axial power flattening, its use for radial flattening becomes more practical.

Figure 6:
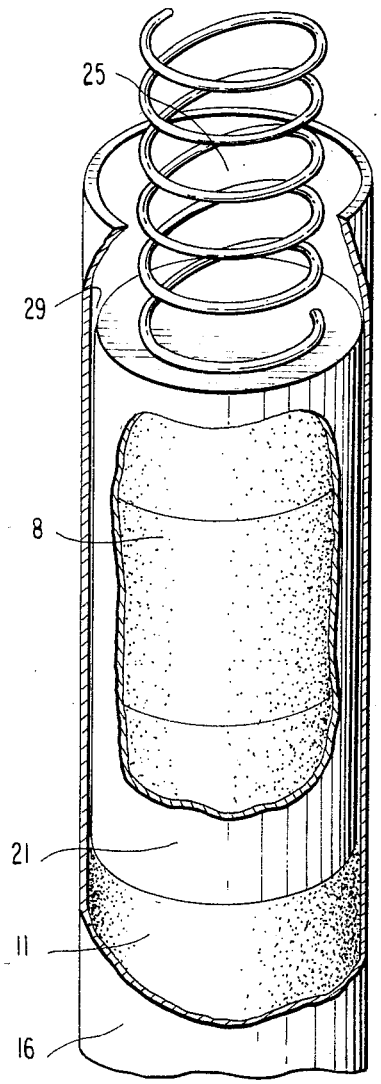
FIG. 6 is a perspective view section of a top of a single fuel rod.

No significant amounts of heat are produced in the $ZrH_2$ other than from neutron moderation and from gamma rays. Thus, during normal operating conditions, the temperature in the $ZrH_2$ should not exceed 300° to 400° C. At temperatures up to 700° C., the vapor pressure of the hydrogen in the $ZrH_2$ does not exceed 1 atmosphere and, therefore, at 300° to 400° C., loss of hydrogen should not be a problem. However, a very thin, separate 0.005–0.006 cm, sealed internal cladding tube 21, as shown in FIG. 6, can be used to contain the $ZrH_2$ to prevent possible hydrogen interaction between the fuel rod cladding tube 16 and the $ZrH_2$. The tube 21 should not completely obstruct the pellet-cladding gap 29 so as to permit fission products to diffuse from the fuel to the gas plenum 25 at the top of the fuel rod. Glass-enamel coating metal cladding, about 0.008 cm thickness, has been successfully utilized in SNAP reactor fuel at temperatures up to 700° C.

The results of a one-dimensional 2-group diffusion theory calculation and one-dimensional nodal calculation are shown in FIG. 4 at beginning-of-life for a typical 8×8 fuel bundle having two water "rods" and fuel rods containing no moderating material, referred to as the "Reference design", and for a bundle having fuel rods containing $ZrH_2$, referred to as the "$ZrH_2$ design". Both the reference design and $ZrH_2$ design fuel rods contain 2.72 w/o $U^{235}$ average enrichment, except for the ends, which are natural uranium (NAT). Each of the reference design rods contains a cap of natural uranium on the top and bottom thereof. Each of the $ZrH_2$ design rods has a natural uranium cap at the lower end thereof. Of the sixty-two fuel rods in the $ZrH_2$ design, sixteen contain $ZrH_2$ in the upper half of the rod 6, and another fourteen contain $ZrH_2$ in the upper quarter of the rod 6. Each of the $ZrH_2$ design rods 6 has a cap of $ZrH_2$ at the top.

As FIG. 4 indicates, the $ZrH_2$ design fuel bundle has a much flatter axial power shape than the reference design. Adjustments in the amount of nuclear fuel replaced by $ZrH_2$ and in the location of the $ZrH_2$ can be made to produce more optimum power shapes. Although rods which contain only moderating material 8 and no fuel 11 do not significantly affect the axial power shape since both the lower and upper sections of the bundle are moderated, these rods do have a significant affect on the radial power shape.

The beneficial effects of adding moderator in the upper voided part of the fuel bundle is best illustrated in Table 1. Table 1 compares the resonance escape probability, P, the infinite multiplication factor, $K\infty$, and the migration area, $M^2$, of the sixty-two fuel rod reference design with five separate sixty-two fuel rod $ZrH_2$ designs, each design operating with 70% water voids. In these five $ZrH_2$ designs, 11, 16, 21, 26 and 30 rods, respectively, contained only $ZrH_2$ and no nuclear fuel. As Table 1 indicates, the resonance escape probability P increases, and the migration area $M^2$ decreases, as additional $ZrH_2$ rods are utilized. The infinite multiplication factor, $K\infty$, initially increases due to the increased moderation and resonance escape, and finally begins to decrease in the thirty $ZrH_2$ rod design principally due to the diminishing amount of fuel in the fuel bundle. The addition of $ZrH_2$ causes the void coefficient of reactivity to decrease (become less negative), and the conversion ratio ($Pu^{239}$ produced per $U^{235}$ consumed) to decrease. The decreased conversion ratio causes the reactivity to decrease faster with burnup, but this can be compensated for in the detailed design process. Obviously, combining fuel rods containing only $ZrH_2$ with fuel rods having varying amounts of $ZrH_2$ results in the most optimum design.

TABLE 1

| Number of Zirconium-hydride rods per 62 fuel-rod bundle | | | | | | |
|---|---|---|---|---|---|---|
| | Reference 0 | 11 | 16 | 21 | 26 | 30 |
| P | .633 | .698 | .728 | .756 | .784 | .805 |
| $K\infty$ | 1.227 | 1.247 | 1.252 | 1.254 | 1.252 | 1.245 |
| $M^2$ | 131.2 | 125.5 | 123.2 | 124.6 | 122.8 | 119.1 |

In a BWR reactor the optimum amount of moderating material used in each of the fuel rods 6 in each of the fuel bundles 2 depends upon many design considerations and design objectives which include, but are not limited to: the initial multiplication factor $K\infty$ of the fuel bundles; the reactivity lifetime of the fuel, $K\infty$ vs. burnup; the control of the reactivity of the reactor during the entire burnup cycle; the thermal hydraulic and heat transfer behavior of the reactor (critical power ratio, local power peaking and radial and axial power peaking factors, and the flow and void distribution); fuel bundle and reactor void coefficient for flow contol stability and safety; and qualitative effects of fuel loading and burnup on the shut-down margin and the scram reactivity. One-dimensional 2-group diffusion theory calculations and one and three-dimensional nodal calculations can be used to determine the optimum amount of moderating material to be placed in each particular fuel rod and to determine the optimum placement of the fuel rods containing moderating material in order to finalize the most optimum reactor design. Ultimately, three-dimensional nodal simulations are required.

I claim:

1. A method of compensating, without the use of control rods or burnable poisons for power shaping, for reduced moderation of neutrons in an uppermost section of the active core of a boiling water nuclear reactor containing a plurality of elongated fuel rods vertically oriented therein, said fuel rods having nuclear fuel therein, said fuel rods being cooled by water pressurized such that boiling thereof occurs, comprising the steps of:

replacing all of said nuclear fuel in a portion of only the upper half of first predetermined ones of said fuel rods with a solid moderator material of zirconium hydride so that said fuel and said moderator material are axially distributed in said predetermined ones of said fuel rods in an asymmetrical manner relative to a plane through the axial midpoint of each rod and perpendicular to the axis of the rod, said predetermined ones of said fuel rods having less fuel in said upper half thereof than is contained in an upper half of other ones of said fuel rods, said moderator material in said upper half of said predetermined ones of said fuel rods, when inserted in said reactor, enhancing moderation of neutrons in said upper half of the active core of said reactor to compensate for reduced moderation provided by water voids created in said water which boils as said water cools said fuel rods;

placing said moderator material in said first predetermined ones of said fuel rods in respective sealed internal cladding tubes, which are separate from respective external cladding tubes of said first predetermined ones of said fuel rods, to prevent interaction between said moderator material and the external cladding tube of each of said first predetermined ones of said fuel rods; and wherein the number of said first predetermined ones of said fuel rods is at least thirty, and further comprising the steps of:

replacing with said moderator material all of the fuel in the upper quarter of each of said at least thirty rods; and also replacing with said moderator material all of the fuel in the adjacent lower quarter of at least sixteen of said at least thirty rods.

2. The method as claimed in claim 1, further comprising the step of arranging said fuel rods into bundles a first one of which contains some of said first predetermined ones of said fuel rods; and determining (1) the amount of said nuclear fuel replaced with said moderator material in each of said first predetermined ones of said fuel rods in said first bundle, and (2) the number of said first predetermined ones of said fuel rods contained in said first bundle so as to flatten an axial power shape of said fuel bundle as compared with a second fuel bundle not having any of said first predetermined ones of said fuel rods.

3. The method as claimed in claim 2, further comprising determining said amount and said number so that said first bundle produces at least two axial power peaks.

4. The method as claimed in claim 2, further comprising determining the locations of said first predetermined ones of said fuel rods in said first bundle to minimize a difference between a maximum axial power peak and a minimum axial power peak produced by said first bundle.

5. The method as claimed in claim 4, wherein said amounts, said number, and said locations are determined so as to produce a first axial power peak in an upper half of said first bundle and a second axial power peak in a lower half of said first bundle, said first axial power peak being less than said second axial power peak.

6. The method as claimed in claim 5, wherein said amounts, said number, and said locations are determined so as to produce a minimum axial power level between said first and second axial power peaks, said minimum axial power level being located in said lower half of said first bundle.

7. The method as claimed in claim 2, further comprising the step of flattening a radial power shape of said first bundle by replacing at least some of said nuclear fuel in second predetermined ones of said fuel rods with said moderator material, amounts of said nuclear fuel replaced with said moderator material in said second predetermined ones of said fuel rods and locations of said second predetermined ones of said fuel rods being determined to flatten said radial power shape.

8. The method as claimed in claim 1, further comprising the step of placing said moderator material in an uppermost section of second predetermined ones of said fuel rods, the axial length of said uppermost section of said second predetermined ones of said fuel rods ranging between 6 and 24 inches to axially reflect neutrons.

9. The method as claimed in claim 1, wherein each of said separate sealed internal cladding tubes has a thickness between 0.005 and 0.008 cm.

10. The method as claimed in claim 1, further comprising the step of spacing each of said sealed internal cladding tubes from said respective external cladding tubes to allow fission products generated by said nuclear fuel to migrate to a gas plenum located above said sealed internal cladding tubes, respectively.

11. A fuel bundle for a boiling water nuclear reactor, said fuel bundle containing a plurality of elongated first cladding tubes vertically oriented therein, said fuel bundle being in the active core of the reactor and being cooled by water pressurized such that boiling thereof occurs, comprising:

a casing;

a plurality of thin elongated first cladding tubes vertically oriented in said casing which defines a perimeter of a plurality of fuel rods, first predetermined ones of said first cladding tubes containing nuclear fuel and a solid moderator material of zirconium hydride, both of which are axially distributed therein in an asymmetrical manner relative to a plane through the axial midpoint of each rod and perpendicular to the axis of the rod, an upper half of said first predetermined ones of said cladding tubes containing less fuel than an upper half of second predetermined ones of said cladding tubes, said upper half of said first predetermined ones of said cladding tubes containing more moderator material than a lower half thereof, amounts of said fuel and said moderator material in said upper half of said first predetermined ones of said cladding tubes and locations of said first predetermined ones of said cladding tubes within said fuel bundle being determined to enhance neutron moderation achieved and power produced in an uppermost section of said fuel bundle to compensate, without the use of control rods or burnable poisons for power shaping, for reduced moderation of said neutrons by said water due to said boiling thereof in an uppermost section of the active core of said boiling water nuclear reactor;

a sealed internal second cladding tube located within each of said first predetermined ones of said first cladding tubes, said moderator material in each of said first predetermined ones of said first cladding tubes being contained in a respective said sealed internal second cladding tube to prevent interaction between said moderator material and said first predetermined ones of said first cladding tubes; and wherein the number of said first predetermined ones of said first cladding tubes is at least thirty, the upper quarter of each of said at least thirty cladding tubes contains only said moderator material, and the adjacent lower quarter of at least sixteen of said at least thirty cladding tubes contains only said moderator material.

12. The fuel bundle as claimed in claim 11, wherein at least one of said first predetermined ones of said first cladding tubes has no nuclear fuel in an uppermost half section thereof, said uppermost half section being mostly filled with said moderator material.

13. The fuel bundle as claimed in claim 11, wherein said amounts and said locations are determined such that at least two axial power peaks are produced by said fuel bundle.

14. The fuel bundle as claimed in claim 13, wherein said amounts and said locations are determined such that a difference between a maximum axial power peak and a minimum axial power peak is minimized.

15. The fuel bundle as claimed in claim 13, wherein said amounts and said locations are determined such that first and second axial power peaks are produced in a lower half and in an upper half of said fuel bundle, respectively.

16. The fuel bundle as claimed in claim 15, wherein said amounts and said locations are determined such that a minimum axial power level located between said first and second axial power peaks is located in said lower half of said fuel bundle.

17. The fuel bundle as claimed in claim 11, wherein third predetermined ones of said first cladding tubes have no nuclear fuel therein and mostly moderator material therein, locations of said third predetermined ones of said first cladding tubes being determined to flatten a radial power shape of said fuel bundle.

18. The fuel bundle as claimed in claim 11, wherein an uppermost section of said first predetermined ones of said first cladding tubes contain said moderator material therein, an axial length of said uppermost section ranging between 6 and 24 inches to axially reflect neutrons.

19. The fuel bundle as claimed in claim 11, wherien said sealed internal second cladding tubes each have a thickness between 0.005 and 0.008 cm.

20. The fuel bundle as claimed in claim 11, wherein said second cladding tubes are spaced from an inner surface of said respective first predetermined ones of said first cladding tubes to allow fission products to migrate to a gas plenum located above said respective second cladding tubes.

21. The method as claimed in claim 1 further comprising the steps of placing a cap of natural uranium on the lower end, and a cap of said moderator material on the upper end, of each of said elongated fuel rods.

22. The method as claimed in claim 1 wherein the number of said plurality of elongated fuel rods is sixty-two.

23. The fuel bundle as claimed in claim 11 wherein the number of said plurality of said first cladding tubes is sixty-two.

* * * * *